US011316627B2

(12) United States Patent
Endo

(10) Patent No.: US 11,316,627 B2
(45) Date of Patent: Apr. 26, 2022

(54) COMMUNICATION SYSTEM, TRANSMISSION DEVICE, COMMUNICATION METHOD, AND RECORDING MEDIUM

(71) Applicant: OLYMPUS CORPORATION, Hachioji (JP)

(72) Inventor: Takahisa Endo, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/147,859

(22) Filed: Jan. 13, 2021

(65) Prior Publication Data

US 2021/0135798 A1 May 6, 2021

Related U.S. Application Data

(63) Continuation of application No. PCT/JP2018/026870, filed on Jul. 18, 2018.

(51) Int. Cl.
*H04L 1/18* (2006.01)
*H04L 1/16* (2006.01)
*H04W 28/14* (2009.01)

(52) U.S. Cl.
CPC .......... *H04L 1/1874* (2013.01); *H04L 1/1657* (2013.01); *H04L 1/1819* (2013.01); *H04W 28/14* (2013.01)

(58) Field of Classification Search
CPC .................................................. H04L 1/1657
See application file for complete search history.

(56) References Cited

U.S. PATENT DOCUMENTS 10,681,382 B1 * 6/2020 Brailovskiy .......... H04N 19/159
2006/0182311 A1 * 8/2006 Lev ........................ G06V 20/62
382/254

(Continued)

FOREIGN PATENT DOCUMENTS

JP 2006-203649 A 8/2006
JP 2010-141625 A 6/2010
WO 2017/130269 A1 8/2017

OTHER PUBLICATIONS

International Search Report dated Sep. 4, 2018, issued in counterpart International Application No. PCT/JP2018/026870, with English Translation. (2 pages).

*Primary Examiner* — Mujtaba M Chaudry
(74) *Attorney, Agent, or Firm* — WHDA, LLP

(57) ABSTRACT

A communication system including a transmission device and a reception device is provided. A processor of the transmission device is configured to store image data on a transmission buffer after deleting all the stored image data in a case in which a first condition and a second condition are met. The processor is configured to store the image data without deleting the stored image data in a case in which at least one of the first condition and the second condition is not met. The first condition indicates that a second transmission-completion frame this time is after a previous first transmission-completion frame. The second condition indicates that a third transmission-completion frame is not the next frame of the transmission-completion second frame. The third transmission-completion frame is a frame of the image data to be stored after confirming the transmission-completion frame this time.

5 Claims, 15 Drawing Sheets

(56) References Cited

U.S. PATENT DOCUMENTS

| | | | | |
|---|---|---|---|---|
| 2008/0313683 A1* | 12/2008 | Shimizu | ............... | H04L 65/602 |
| | | | | 725/94 |
| 2009/0100050 A1* | 4/2009 | Erol | .................... | G06V 30/414 |
| | | | | 707/999.005 |
| 2009/0185053 A1* | 7/2009 | Ejima | .................. | G11B 27/034 |
| | | | | 348/E5.031 |

* cited by examiner

COMMUNICATION SYSTEM, TRANSMISSION DEVICE, COMMUNICATION METHOD, AND RECORDING MEDIUM

The present application is a continuation application based on International Patent Application No. PCT/JP2018/026870 filed on Jul. 18, 2018, the content of which is incorporated herein by reference.

BACKGROUND OF THE INVENTION

Field of the Invention

The present invention relates to a communication system, a transmission device, a communication method, and a recording medium.

Description of Related Art

Endoscope devices are used in various fields in order to observe the space that is unable to be directly observed from the outside. As an endoscope system, a wireless endoscope system including an endoscope device and a reception device has been proposed. The endoscope device is disposed at the distal end of an insertion unit to be inserted into a subject and wirelessly transmits a captured image. The reception device receives the image wirelessly transmitted from the endoscope device and displays the received image. Reducing the display delay of the image as much as possible is required in order to secure operability when a user operates the endoscope device while watching the image. Ideally, transmitting image data of one frame in one frame period is preferable.

In fact, the number of times of retransmitting wireless packets tends to increase as the communication quality of a wireless path deteriorates. There are cases in which it is unable to update the displayed image for each frame since it is unable to complete transmitting image data of one frame in one frame period. Consequently, the delay between an imaging timing and a display timing increases, the state (called as unsmooth movement) in which movement of the image is not smoothly expressed occurs, and other phenomena may also occur.

For example, in the image transmission system disclosed in Japanese Unexamined Patent Application, First Publication No. 2006-203649, the device on the transmission side sequentially transmits input images to which first time information is attached. When a predetermined amount of time has passed since the time point indicated by the first time information, the device deletes image data accumulated in an image transmission buffer. In other words, the image transmission system determines whether or not transmission of image data of one frame in one frame period has been completed, cancels transmission of an image frame that is being wirelessly transmitted, and starts transmission of a next image frame if the transmission of the image data has not been completed.

SUMMARY OF THE INVENTION

According to a first aspect of the present invention, a communication system includes a transmission device and a reception device. The transmission device includes an imaging device, a transmission buffer, a processor, and a communicator. The imaging device is configured to acquire image data of a frame image captured for each predetermined frame cycle. The communicator is configured to wirelessly communicate with the reception device. The processor is configured to cause the communicator to transmit the image data stored on the transmission buffer at a predetermined transmission speed. The processor is configured to delete the image data of which transmission has been completed from the transmission buffer. The processor is configured to confirm, for each frame cycle, a transmission-completion frame that is a frame of the image data of which transmission has been completed. The processor is configured to store the image data acquired by the imaging device on the transmission buffer after deleting all the image data stored on the transmission buffer in a case in which a first condition and a second condition are met. The first condition indicates that a frame number of the transmission-completion frame confirmed in a frame cycle this time is greater than a frame number of the transmission-completion frame confirmed in a previous frame cycle. The second condition indicates that a frame number of a frame of the image data to be stored on the transmission buffer after the transmission-completion frame is confirmed in the frame cycle this time is greater than a frame number acquired by adding one to the frame number of the transmission-completion frame confirmed in the frame cycle this time. The processor is configured to store the image data acquired by the imaging device on the transmission buffer without deleting the image data stored on the transmission buffer in a case in which at least one of the first condition and the second condition is not met.

According to a second aspect of the present invention, in the first aspect, the reception device includes a processor configured to identify a frame of the image data of which reception has been completed and transmit frame information indicating the identified frame to the transmission device. The processor of the transmission device is configured to confirm the frame indicated by the frame information received from the transmission device as the transmission-completion frame.

According to a third aspect of the present invention, a transmission device includes an imaging device, a transmission buffer, a processor, and a communicator. The imaging device is configured to acquire image data of a frame image captured for each predetermined frame cycle. The communicator is configured to wirelessly communicate with a reception device. The processor is configured to cause the communicator to transmit the image data stored on the transmission buffer at a predetermined transmission speed. The processor is configured to delete the image data of which transmission has been completed from the transmission buffer. The processor is configured to confirm, for each frame cycle, a transmission-completion frame that is a frame of the image data of which transmission has been completed. The processor is configured to store the image data acquired by the imaging device on the transmission buffer after deleting all the image data stored on the transmission buffer in a case in which a first condition and a second condition are met. The first condition indicates that a frame number of the transmission-completion frame confirmed in a frame cycle this time is greater than a frame number of the transmission-completion frame confirmed in a previous frame cycle. The second condition indicates that a frame number of a frame of the image data to be stored on the transmission buffer after the transmission-completion frame is confirmed in the frame cycle this time is greater than a frame number acquired by adding one to the frame number of the transmission-completion frame confirmed in the frame cycle this time. The processor is configured to store the image data acquired by the imaging device on the transmission buffer without deleting the image data stored on the transmission buffer in a case in which at least one of the first condition and the second condition is not met.

According to a fourth aspect of the present invention, communication method executed by a transmission terminal includes a first step, a second step, a third step, a fourth step, and a fifth step. The transmission device includes an imaging device, a transmission buffer, and a communicator. The imaging device is configured to acquire image data of a frame image captured for each predetermined frame cycle. The communicator is configured to wirelessly communicate with a reception device. In the first step, the communicator transmits the image data stored on the transmission buffer to the reception device at a predetermined transmission speed. In the second step, the image data of which transmission has been completed are deleted from the transmission buffer. In the third step, for each frame cycle, a transmission-completion frame that is a frame of the image data of which transmission has been completed is confirmed. In the fourth step, the image data acquired by the imaging device are stored on the transmission buffer after all the image data stored on the transmission buffer are deleted in a case in which a first condition and a second condition are met. The first condition indicates that a frame number of the transmission-completion frame confirmed in a frame cycle this time is greater than a frame number of the transmission-completion frame confirmed in a previous frame cycle. The second condition indicates that a number of a frame of the image data to be stored on the transmission buffer after the transmission-completion frame is confirmed in the frame cycle this time is greater than a frame number acquired by adding one to the frame number of the transmission-completion frame confirmed in the frame cycle this time. In the fifth step, the image data acquired by the imaging device are stored on the transmission buffer without the image data stored on the transmission buffer being deleted in a case in which at least one of the first condition and the second condition is not met.

According to a fifth aspect of the present invention, a non-transitory computer-readable recording medium saves a program for causing a computer of a transmission terminal to execute a first process, a second process, a third process, a fourth process, and a fifth process. The transmission device includes an imaging device, a transmission buffer, and a communicator. The imaging device is configured to acquire image data of a frame image captured for each predetermined frame cycle. The communicator is configured to wirelessly communicate with a reception device. In the first process, the communicator transmits the image data stored on the transmission buffer to the reception device at a predetermined transmission speed. In the second process, the image data of which transmission has been completed are deleted from the transmission buffer. In the third process, for each frame cycle, a transmission-completion frame that is a frame of the image data of which transmission has been completed is confirmed. In the fourth process, the image data acquired by the imaging device are stored on the transmission buffer after all the image data stored on the transmission buffer are deleted in a case in which a first condition and a second condition are met. The first condition indicates that a frame number of the transmission-completion frame confirmed in a frame cycle this time is greater than a frame number of the transmission-completion frame confirmed in a previous frame cycle. The second condition indicates that a frame number of a frame of the image data to be stored on the transmission buffer after the transmission-completion frame is confirmed in the frame cycle this time is greater than a frame number acquired by adding one to the frame number of the transmission-completion frame confirmed in the frame cycle this time. In the fifth process, the image data acquired by the imaging device are stored on the transmission buffer without the image data stored on the transmission buffer being deleted in a case in which at least one of the first condition and the second condition is not met.

DETAILED DESCRIPTION OF THE INVENTION

Hereinafter, embodiments of the present invention will be described with reference to the drawings.

First Embodiment

Figure 1:
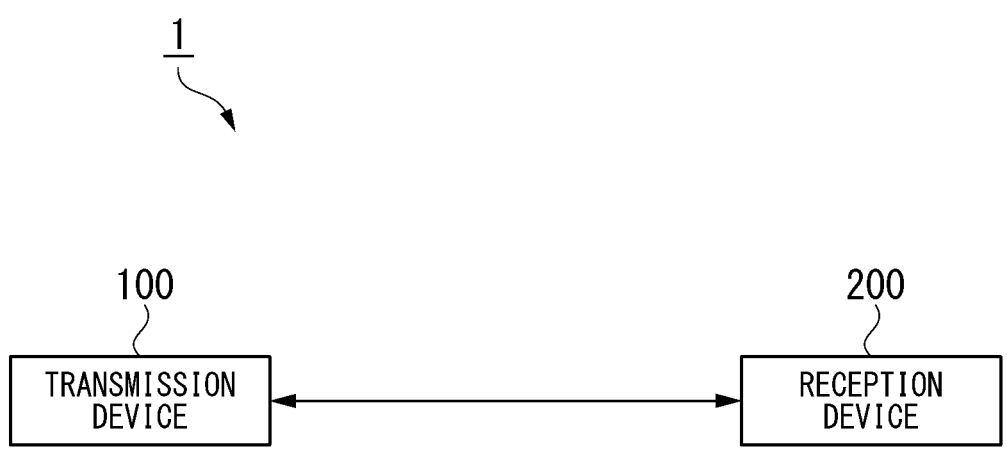
FIG. 1 is a schematic bloc diagram showing an example of a configuration of a wireless communication system according to a first embodiment.

FIG. 1 shows a schematic bloc diagram showing an example of a configuration of a wireless communication system 1 according to a first embodiment of the present invention.

The wireless communication system 1 includes a transmission device 100 and a reception device 200. The transmission device 100 and the reception device 200 are wirelessly connected to each other so that they wirelessly transmit and receive various pieces of data to and from each other. The transmission device 100 functions as a picture transmission device that sequentially acquires picture data and wirelessly transmits the acquired picture data. The transmission device 100 may function as a client. The reception device 200 functions as a picture reception device that wirelessly receives the picture data from the transmission device 100 and displays a picture on the basis of the received picture data. The reception device 200 may function as, for example, an access point (AP).

Next, an example of a configuration of the transmission device 100 according to the embodiment will be described.

Figure 2:
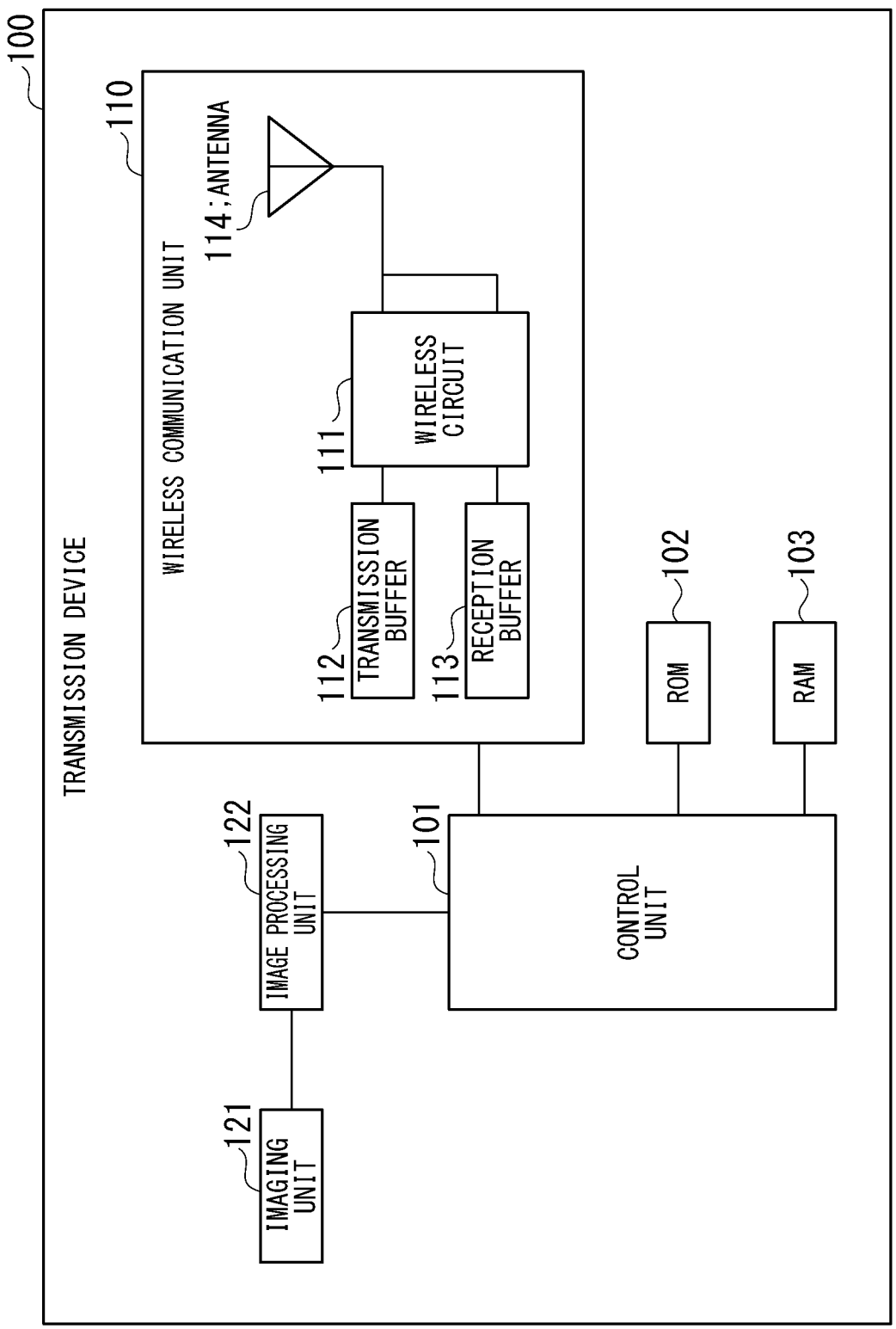
FIG. 2 is a schematic bloc diagram showing an example of a configuration of a transmission device according to the first embodiment.

FIG. 2 is a schematic bloc diagram showing an example of a configuration of the transmission device 100 according to the embodiment.

The transmission device 100 includes a control unit 101, a read-only memory (ROM) 102, a random-access memory (RAM) 103, a wireless communication unit 110, an imaging unit 121, and an image processing unit 122.

The control unit 101 controls the functions of the transmission device 100. The control unit 101 includes one or more processors such as a central processing unit (CPU). The control unit 101 reads a program stored on the ROM 102 in advance and executes processing indicated by directions specified in the read program, thus realizing sequence control. In the following descriptions, executing the processing indicated by the directions specified in the program may be simply called "execute a program."

The ROM 102 is a non-volatile memory that permanently stores various pieces of data required for the operation of the transmission device 100 and various pieces of data acquired through the operation of the transmission device 100. The ROM 102 is, for example, a flash ROM. The data stored on the ROM 102 include, for example, a program executed by the control unit 101, various pieces of setting data, and the like. The setting data include, for example, a communication-setting parameter and the like.

The RAM 103 is a volatile memory that temporarily stores various pieces of data required for the operation of the transmission device 100 and various pieces of data acquired through the operation of the transmission device 100. The RAM 103 includes, for example, a buffer area, a work area, a setting area, and the like as a storage area. The buffer area temporarily stores, for example, image data provided from the image processing unit 122. The work area temporarily stores, for example, an operation value acquired through the numerical operation by the control unit 101. The setting area temporarily stores various pieces of setting data in the operation of the control unit 101. The temporarily stored setting data may include the above-described communication-setting parameter.

The wireless communication unit 110 wirelessly connects to external equipment by using a predetermined communication method and transmits and receives various pieces of data. As the predetermined communication method, for example, a method prescribed by a wireless local-area-network (LAN) standard such as IEEE802.11 is available.

The wireless communication unit 110 is, for example, a communicator including a wireless transmitter and a wireless receiver. More specifically, the wireless communication unit 110 includes a wireless circuit 111, a transmission buffer 112, a reception buffer 113, and an antenna 114.

The wireless circuit 111 includes, for example, an electric circuit (not shown in the drawing) such as a high-frequency circuit and an encoding/decoding circuit and is electrically connected to the antenna 114.

The high-frequency circuit down-converts a reception signal of a wireless-frequency band received by the antenna 114 into a reception signal of a base-frequency band and demodulates the reception signal acquired through the down-converting by using a predetermined demodulation method. The high-frequency circuit outputs encoded data acquired through the demodulation to the encoding/decoding circuit. On the other hand, the high-frequency circuit modulates encoded data input from the encoding/decoding circuit by using a predetermined modulation method and up-converts a transmission signal acquired through the modulation into a transmission signal of the wireless-frequency band. The high-frequency circuit supplies the antenna 114 with the transmission signal acquired through the up-converting.

The encoding/decoding circuit performs encoding processing on data packets accumulated in the transmission buffer 112, generates encoded data, and outputs the encoded data to the high-frequency circuit. The control unit 101 prioritizes the data packet stored earlier on the transmission buffer 112 than the other data packets in encoding processing. Accordingly, image data are wirelessly transmitted for each data packet by using the antenna 114.

In addition, the encoding/decoding circuit decodes encoded data input from the high-frequency circuit by using a predetermined decoding method, acquires data packets, and sequentially stores the acquired data packets on the reception buffer 113.

The transmission buffer 112 is a buffer memory temporarily storing a data packet as transmission data input from the control unit 101. The control unit 101 sequentially reads the image data temporarily stored on the RAM 103 and divides the image data into segment data having a predetermined amount of information. The control unit 101 prioritizes a portion stored earlier on the RAM 103 than the other portions when the image data are read. The control unit 101 generates a data packet including each piece of the segment data and stores the generated data packet on the transmission buffer 112. Thus, storing the data packet on the transmission buffer 112 is controlled in accordance with an instruction from the control unit 101.

The reception buffer 113 is a buffer memory temporarily storing each data packet acquired when the wireless circuit 111 demodulates and decodes the reception signal as reception data. Reading the data packet from the reception buffer 113 is controlled in accordance with an instruction from the control unit 101.

The imaging unit 121 captures an image at a predetermined frame rate (for example, any one of 30, 60, and 120 frames per second) and generates an image signal indicating the captured image. The imaging unit 121 outputs the generated image signal to the image processing unit 122. The imaging unit 121 may be constituted, for example, as an imaging apparatus such as a digital camera. More specifically, the imaging unit 121 includes a lens, a photoelectric convertor, and an analog-to-digital (AD) converter (not shown in the drawing). The lens converges incident light on the surface of the photoelectric convertor. The image generated by the converged light is formed on the surface of the photoelectric convertor. The photoelectric convertor converts the light received on the surface into an electric signal and outputs the electric signal to the AD converter. The photoelectric convertor is, for example, a solid-state imaging device such as a charge-coupled device (CCD) sensor or a complementary metal-oxide-semiconductor (CMOS) sensor. The AD converter converts an analog electric signal input from the photoelectric convertor into a digital image signal.

The image processing unit 122 generates image data indicating an image of each frame on the basis of the image signal input from the imaging unit 121. The image processing unit 122 generates a vertical synchronizing signal (Vsync) for each frame cycle and attaches the generated vertical synchronizing signal to the head of each frame of the input image signal when the image processing unit 122 generates the image data. The vertical synchronizing signal indicates a segment indicating an image of each frame. The image processing unit 122 may perform compression-encoding on the image signal to which the vertical synchronizing signal has been attached by using a predetermined image-encoding method. As the predetermined image-encoding method, for example, an encoding method corresponding to a decoding method prescribed in any one of MPEG-4 advanced video-coding (AVC) and MPEG-H high-efficiency video-coding (HEVC) is available. In addition, as the above-described segment data, for example, a network-abstraction-layer (NAL) unit prescribed in these methods may be used. The image processing unit 122 sequentially stores the generated image data on the buffer area of the RAM 103. The image processing unit 122 outputs the vertical synchronizing signal generated for each frame cycle to the control unit 101.

Next, an example of a configuration of the reception device 200 according to the embodiment will be described.

Figure 3:
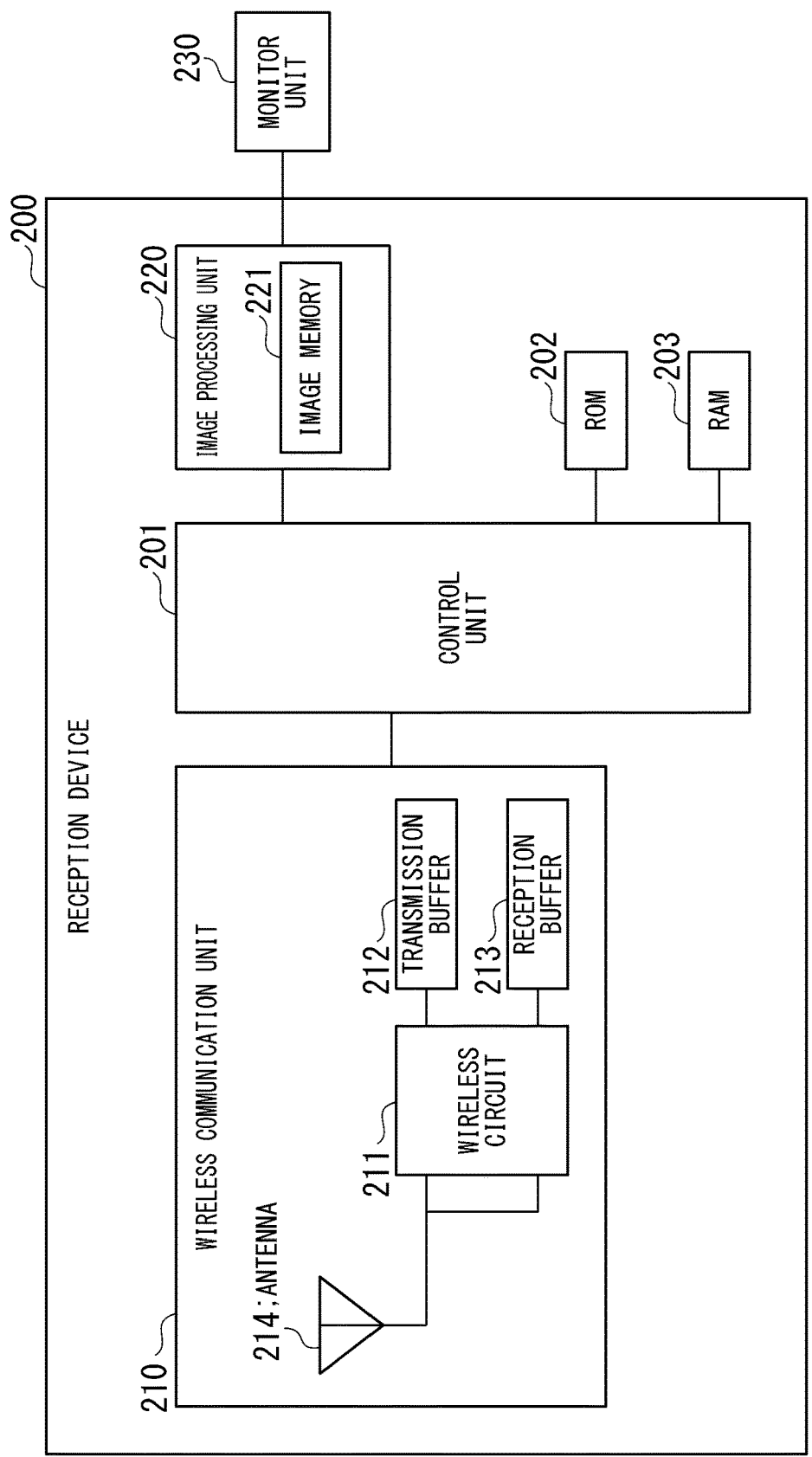
FIG. 3 is a schematic bloc diagram showing an example of a configuration of a reception device according to the first embodiment.

FIG. 3 is a schematic bloc diagram showing an example of a configuration of the reception device 200 according to the embodiment.

The reception device 200 includes a control unit 201, a ROM 202, a RAM 203, a wireless communication unit 210, and an image processing unit 220.

The control unit 201 controls the functions of the reception device 200. The control unit 201 includes one or more processors such as a CPU. The control unit 201 reads a program stored on the ROM 202 in advance and executes the read program, thus realizing sequence control.

The ROM 202 is a non-volatile memory that permanently stores various pieces of data required for the operation of the reception device 200 and various pieces of data acquired through the operation. The ROM 202 is, for example, a flash ROM or the like. The data stored on the ROM 202 include, for example, a program executed by the control unit 201, various pieces of setting data, and the like. The setting data include, for example, a communication-setting parameter and the like.

The RAM 203 is a volatile memory that temporarily stores various pieces of data required for the operation of the reception device 200 and various pieces of data acquired through the operation. The RAM 203 includes, for example, a buffer area, a work area, a setting area, and the like as a storage area. The buffer area temporarily stores, for example, reception data provided from the wireless communication unit 210. The work area temporarily stores, for example, an operation value acquired through the numerical operation by the control unit 201. The setting area temporarily stores various pieces of setting data in the operation of the control unit 201. The temporarily stored setting data may include the above-described communication-setting parameter.

The wireless communication unit 210 wirelessly connects to external equipment by using a predetermined communication method and transmits and receives various pieces of data. As the predetermined communication method, for example, the same communication method as that in the transmission device 100 that is a communication partner is used.

The wireless communication unit 210 is, for example, a communicator including a wireless transmitter and a wireless receiver. More specifically, the wireless communication unit 210 includes a wireless circuit 211, a transmission buffer 212, a reception buffer 213, and an antenna 214.

The wireless circuit 211 includes, for example, an electric circuit (not shown in the drawing) such as a high-frequency circuit and an encoding/decoding circuit and is electrically connected to the antenna 214.

The high-frequency circuit down-converts a reception signal of a wireless-frequency band received by the antenna 214 into a reception signal of a base-frequency band and demodulates the reception signal acquired through the down-converting by using a predetermined demodulation method. The demodulation method has only to be a method corresponding to the modulation method used by the wireless circuit 111 of the transmission device 100 for modulating the transmission signal. The high-frequency circuit outputs encoded data acquired through the demodulation to the encoding/decoding circuit. On the other hand, the high-frequency circuit modulates encoded data input from the encoding/decoding circuit by using a predetermined modulation method and up-converts a transmission signal acquired through the modulation into a transmission signal of the wireless-frequency band. The modulation method has only to be a method corresponding to the demodulation method used by the wireless circuit 111 of the transmission device 100 for demodulating the reception signal. The high-frequency circuit supplies the antenna 214 with the transmission signal acquired through the up-converting.

The encoding/decoding circuit sequentially reads data packets accumulated in the transmission buffer 212, performs encoding processing on the read data packets, and generates encoded data. The encoding method used for the encoding processing has only to be a method corresponding to the decoding method used by the wireless circuit 111 of the transmission device 100 for decoding the reception signal. The encoding/decoding circuit outputs the generated encoded data to the high-frequency circuit.

In addition, the encoding/decoding circuit decodes encoded data input from the high-frequency circuit by using a predetermined decoding method, acquires data packets, and sequentially stores the acquired data packets on the reception buffer 213. The decoding method used for the decoding processing has only to be a method corresponding to the encoding method used by the wireless circuit 111 of the transmission device 100 for encoding the transmission signal.

The transmission buffer 212 is a buffer memory temporarily storing a data packet as transmission data input from the control unit 201. Storing the data packet on the transmission buffer 212 is controlled in accordance with an instruction from the control unit 201.

The reception buffer 213 is a buffer memory temporarily storing each data packet acquired when the wireless circuit 211 demodulates and decodes the reception signal as reception data. Reading the data packet from the reception buffer 213 is controlled in accordance with an instruction from the control unit 201. Here, the control unit 201 prioritizes the data packet received earlier than the other data packets when data packets are read and extracts the reception data from the read data packet. The extracted reception data are equivalent to the transmission data transmitted by the transmission device 100. The control unit 201 stores the extracted reception data on the RAM 203.

The image processing unit 220 reads the reception data stored on the RAM 203 as each piece of segment data and generates an image signal indicating an image of each frame by sequentially linking together the read segment data. Here, the image processing unit 220 includes an image memory 221 and temporarily stores the read segment data on the image memory 221. The image processing unit 220 generates the image signal having a predetermined format indicating an image of one frame each time the image processing unit 220 reads a portion of the vertical synchronizing signal (Vsync). The image processing unit 220 outputs the generated image signal to a monitor unit 230. As the format of the image signal, for example, a format prescribed in image standards such as the national-television-system-committee (NTSC) format or the high-definition multimedia interface (HDMI) (registered trademark) format is available.

The monitor unit 230 displays an image on the basis of the image signal input from the image processing unit 220. The monitor unit 230 includes an image display device and a control circuit. The image display device may be, for example, any one of a liquid crystal display, an organic electroluminescent display, and the like. The control circuit controls image display by the image display device. The control circuit controls, for example, the brightness, the contrast, and the like of the image indicated by the image signal input from the image processing unit 220. The control circuit outputs the image signal that has been controlled to the image display device.

Next, an example of an operation of the transmission device 100 according to the embodiment will be described.

Figure 4:
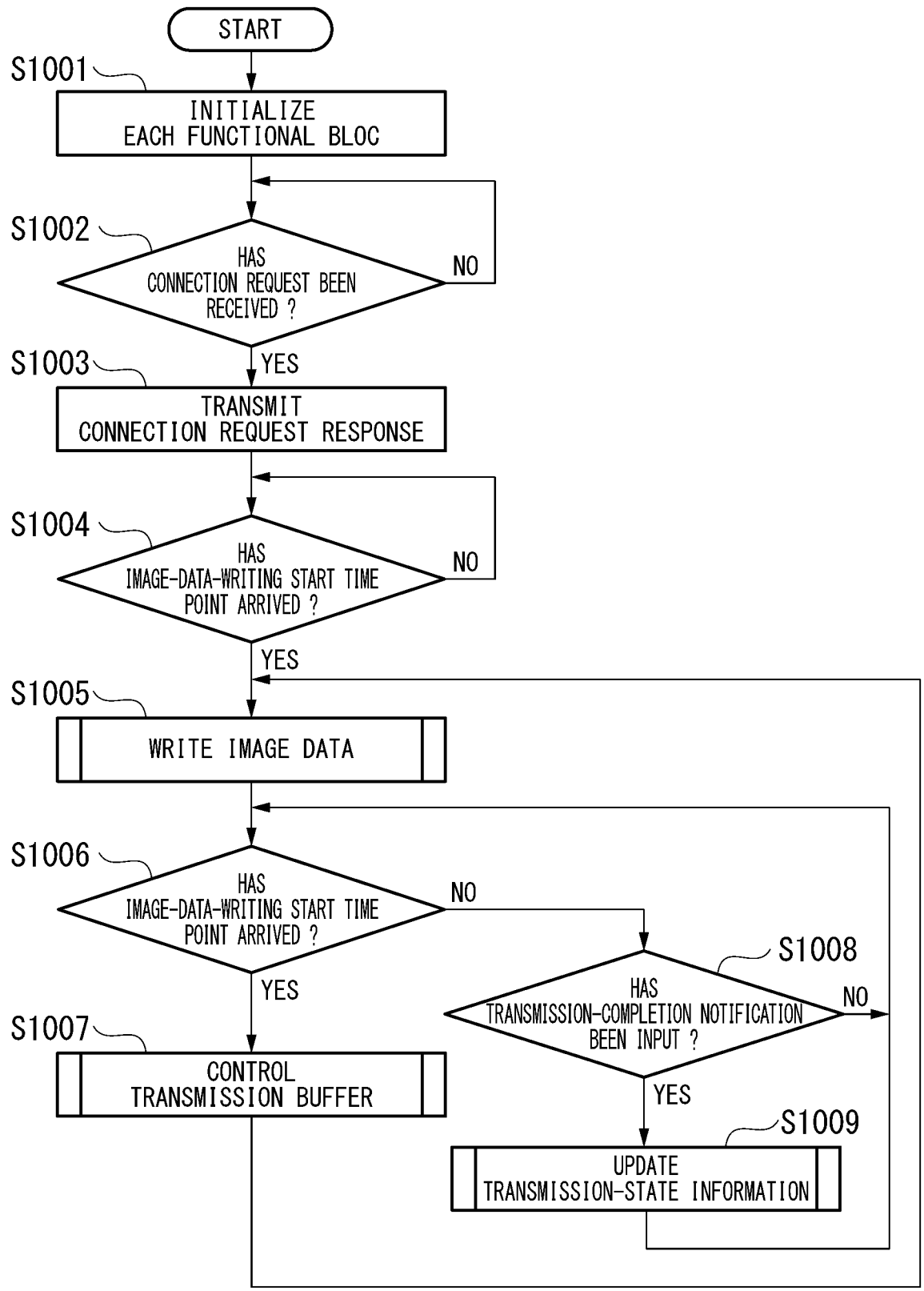
FIG. 4 is a flow chart showing an example of an operation of the transmission device according to the first embodiment.

FIG. 4 is a flow chart showing an example of an operation of the transmission device 100 according to the embodiment.

(Step S1001) When the supply of electric power is started (power source is turned on), the control unit 101 initializes each functional unit of the transmission device 100. At this time, parameters required for the operation are set in each functional unit. For example, an initial value of a communication channel is set in the wireless communication unit 110. Thereafter, the processing of Step S1002 is executed.

(Step S1002) The control unit 101 waits for a connection request. The connection request includes, for example, information such as a media-access-control (MAC) address as identification information of the reception device 200. When the connection request is received from the reception device 200 (Step S1002—YES), the processing of Step S1003 is executed. When the control unit 101 does not receive the connection request (Step S1002—NO), the processing of Step S1002 is repeated.

(Step S1003) The control unit 101 transmits a connection request response that is a response for the connection request to the reception device 200 via the wireless communication unit 110. Thereafter, the processing of Step S1003 is executed.

(Step S1004) The control unit 101 determines whether or not the time point (present time point) has passed by an image-data-writing start time point. The control unit 101, for example, can determine that the present time point has passed by the image-data-writing start time point when the time point of a timer at the present time point reaches a predetermined time point. The image-data-writing start time point is set in advance to a time point closer to the start time point of each frame cycle than the end time point of each frame cycle. However, the image-data-writing start time point in Step S1004 is the image-data-writing start time point of first time immediately after activation. The control unit 101 sets the time point of the timer to an initial value (for example, 0) for each frame of the image data by executing interruption processing of the vertical synchronizing signal (Vsync). The interruption processing of the vertical synchronizing signal will be described later. When the present time point has passed by the image-data-writing start time point (Step S1004—YES), the processing of Step S1005 is executed. When the present time point has not passed by the image-data-writing start time point (Step S1004—NO), the processing of Step S1004 is repeated.

(Step S1005) The control unit 101 executes image-data-writing processing. The image-data-writing processing will be described later. Thereafter, the processing of Step S1006 is executed.

(Step S1006) The control unit 101 determines whether or not the present time point has passed by the image-data-writing start time point. When the present time point has passed by the image-data-writing start time point (Step S1006—YES), the processing of Step S1007 is executed. When the present time point has not passed by the image-data-writing start time point (Step S1006—NO), the processing of Step S1008 is executed.

(Step S1007) The control unit 101 executes transmission-buffer control. The transmission-buffer control will be described later. Thereafter, the processing of Step S1006 is executed.

(Step S1008) The control unit 101 determines whether or not a transmission-completion notification has been input from the wireless communication unit 110. The transmission-completion notification is information indicating completion of transmitting the image data of one frame. When the transmission-completion notification is input (Step S1008—YES), the processing of Step S1009 is executed. When the transmission-completion notification is not input (Step S1008—NO), the processing of Step S1006 is executed.

(Step S1009) The control unit 101 updates transmission-state information of the image data. The transmission-state information includes information of the frame of the image data that are being transmitted at the present time point or information of the frame of the image data of which transmission has been completed. Updating the transmission-state information will be described later. Thereafter, the processing of Step S1006 is executed.

Figure 5:
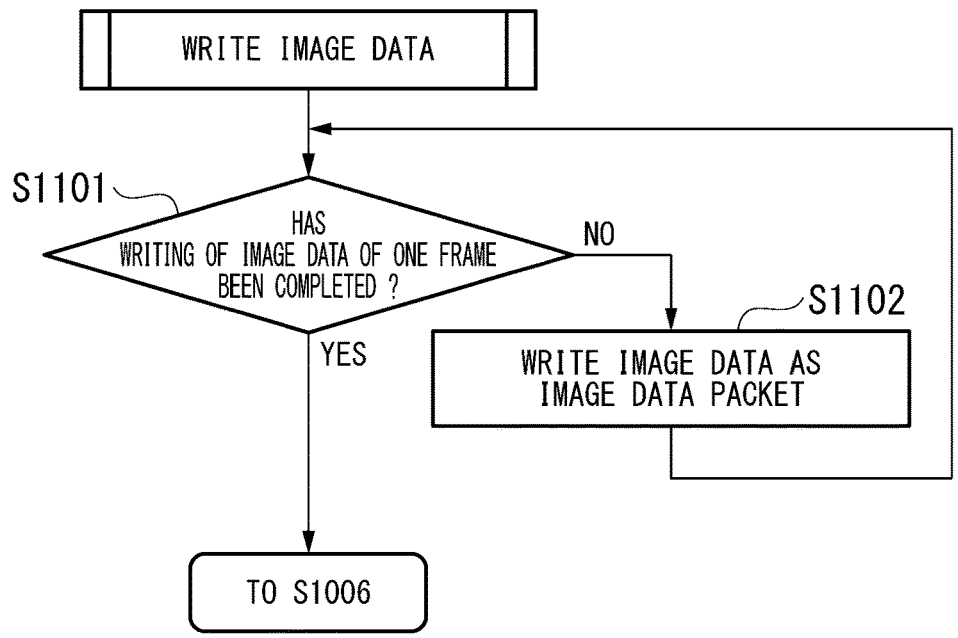
FIG. 5 is a flow chart showing an example of image-data-writing processing according to the first embodiment.

Next, an example of the image-data-writing processing will be described. FIG. 5 is a flow chart showing an example of the image-data-writing processing according to the embodiment.

The image-data-writing processing includes processing of Step S1101 and processing of Step S1102.

(Step S1101) The control unit 101 determines whether or not writing the image data of one frame on the transmission buffer 112 of the wireless communication unit 110 has been completed. When the control unit 101, for example, detects the vertical synchronizing signal from the image data read from the RAM 103, the control unit 101 can determine that writing the image data of the previous frame has been completed. When the control unit 101 determines that writing the image data has been completed (Step S1101—YES), the processing of Step S1006 (FIG. 4) is executed. When the control unit 101 determines that writing the image data has not been completed (Step S1101—NO), the processing of Step S1102 is executed.
(Step S1102) The control unit 101 reads the image data that have not been written from the RAM 103 and divides the image data into segment data having a predetermined amount of information. The control unit 101 generates an image data packet having a predetermined format for each piece of the divided segment data and stores the generated image data packet on the transmission buffer 112. Thereafter, the processing of Step S1006 is executed.

Figure 6:
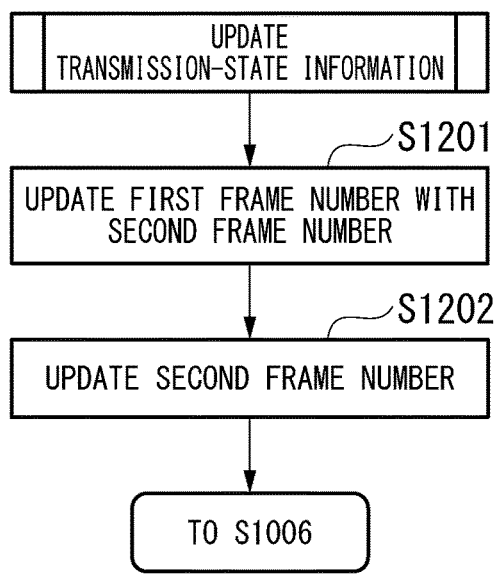
FIG. 6 is a flow chart showing an example of update processing of transmission-state information according to the first embodiment.

Next, an example of update processing of the transmission-state information will be described. FIG. 6 is a flow chart showing an example of the update processing of the transmission-state information according to the embodiment.
(Step S1201) When frame information indicating a second frame number is input from the wireless circuit 111 of the wireless communication unit 110 as information of the frame that has been transmitted, the control unit 101 updates a first frame number with the second frame number set at the present time point. Here, the first frame number means the frame number indicated by the latest frame information acquired by the previous image-data-writing start time point. The second frame number means the frame number indicated by the latest frame information acquired by the image-data-writing start time point this time. The image-data-writing start time point this time is the latest image-data-writing start time point at the present time point. The previous image-data-writing start time point is the image-data-writing start time point before the image-data-writing start time point this time. Thereafter, the processing of Step S1202 is executed.
(Step S1202) The control unit 101 updates the second frame number with the frame number indicated by the frame information input from the wireless circuit 111. Thereafter, the processing of Step S1006 (FIG. 4) is executed.

Figure 7:
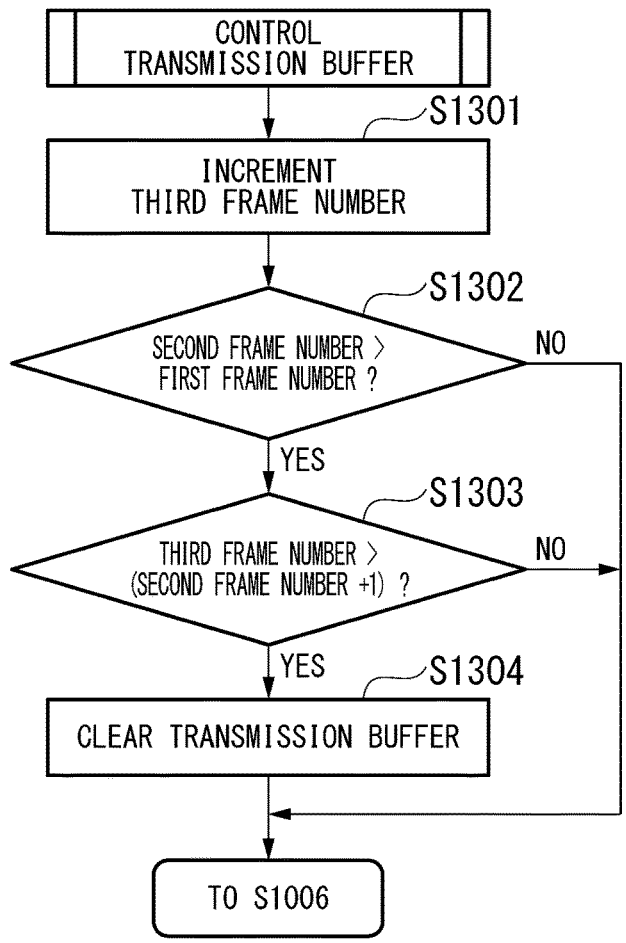
FIG. 7 is a flow chart showing an example of transmission-buffer control according to the first embodiment.

Next, an example of update processing of the transmission-buffer control will be described. FIG. 7 is a flow chart showing an example of the transmission-buffer control according to the embodiment.
(Step S1301) The control unit 101 increments a third frame number. Here, the third frame number means the frame number of the image data to be written on the transmission buffer 112 from the image-data-writing start time point this time. Through the increment, the third frame number increases by 1. Thereafter, the processing of Step S1302 is executed.
(Step S1302) The control unit 101 determines whether or not the following determination condition 1 is established.

Determination condition 1: second frame number>first frame number

The control unit 101 determines whether the frame number (second frame number) for which transmission completion has been confirmed this time has proceeded to the number greater by 1 than the frame number (first frame number) for which transmission completion has been confirmed before this time (established) or there is no change (not established) in accordance with the determination condition 1.

When the control unit 101 determines that the determination condition 1 is established (Step S1302—YES), the processing of Step S1303 is executed. When the control unit 101 determines that the determination condition 1 is not established (Step S1302—NO), the processing of Step S1006 (FIG. 4) is executed.

(Step S1303) The control unit 101 determines whether or not the following determination condition 2 is established.

Determination condition 2: third frame number>(second frame number+1)

The control unit 101 determines whether the frame (third frame number) is the next frame of the frame (second frame number) (not established) or the later frame (established) in accordance with the determination condition 2. The frame (third frame number) is a frame of the image data to be stored on the transmission buffer 112 after transmission completion has been confirmed this time. The frame (second frame number) is a frame for which transmission completion has been confirmed this time. When the control unit 101 determines that the determination condition 2 is established (Step S1303—YES), the processing of Step S1304 is executed. When the control unit 101 determines that the determination condition 2 is not established (Step S1303—NO), the processing of Step S1006 is executed.
(Step S1304) The control unit 101 clears (deletes) all the image data packets stored on the transmission buffer 112. Thereafter, the processing of Step S1006 is executed.

Figure 8:
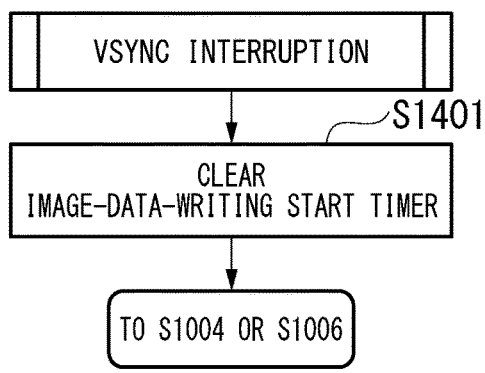
FIG. 8 is a flow chart showing an example of interruption processing of a vertical synchronizing signal according to the first embodiment.

Next, an example of the interruption processing of the vertical synchronizing signal (Vsync) will be described. FIG. 8 is a flow chart showing an example of the interruption processing of the vertical synchronizing signal according to the embodiment.
(Step S1401) The control unit 101 sets (clears) the time point of its own timer to an initial value for each vertical synchronizing period (Vsync period) and resumes time measurement by the timer. The control unit 101 can identify the vertical synchronizing period by detecting, for example, the vertical synchronizing signal input from the image processing unit 122. Accordingly, the timer of the control unit 101 measures a time point for each frame. The measured time point is used in the processing of Step S1004 and Step S1006 (FIG. 4).

Figure 9:
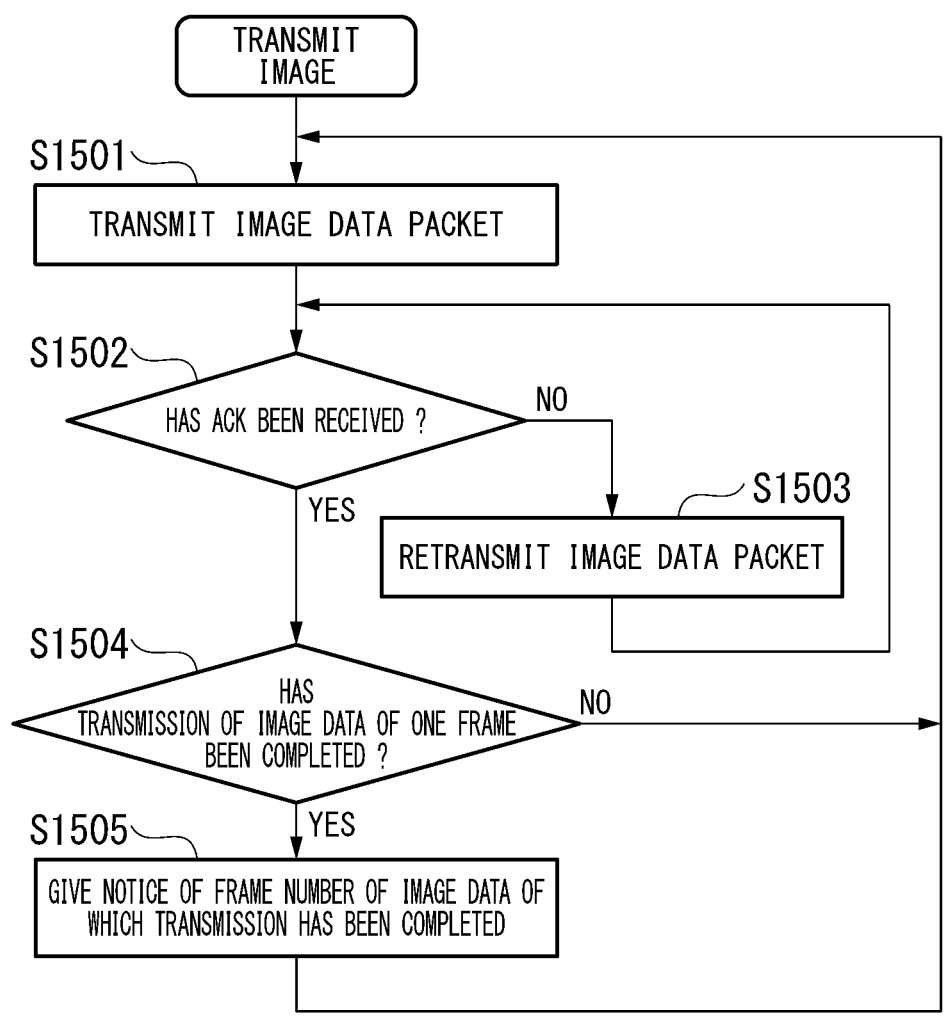
FIG. 9 is a flow chart showing an example of transmission processing of image data according to the first embodiment.

Next, an example of transmission processing of the image data will be described. FIG. 9 is a flow chart showing an example of the transmission processing of the image data according to the embodiment.
(Step S1501) The wireless circuit 111 reads the image data packets one by one from the transmission buffer 112 and wirelessly transmits the read image data packets. The image data packets are transmitted at a transmission speed in accordance with the amount of information of the segment data included in each image data packet and the transmission interval of the image data packet. Thereafter, the processing of Step S1502 is executed.
(Step S1502) The wireless circuit 111 determines whether or not a reception confirmation (ACK) as a response signal for each of the transmitted image data packets has been received from the reception device 200. When the wireless circuit 111 determines that the reception confirmation has been received (Step S1502—YES), the processing of Step S1504 is executed. When the wireless circuit 111 determines that the reception confirmation has not been received (Step S1502—NO), the processing of Step S1503 is executed.
(Step S1503) The wireless circuit 111 reads the image data packet for which the reception confirmation has not been received from the transmission buffer 112 and wirelessly retransmits the read image data packet. The image data packet for which the reception confirmation has not been received may be the image data packet for which a reception failure (NACK) has been received and the image data packet for which the reception confirmation (ACK) or the reception failure (NACK) has not been received within a predetermined amount of time since transmitting the image data packet. Thereafter, the processing of Step S1502 is executed.
(Step S1504) The wireless circuit 111 determines whether or not transmission of the image data of one frame has been completed. When the reception confirmations (ACK) are received for all the image data packets in one frame from a certain vertical synchronizing signal (Vsync) to a next vertical synchronizing signal, the wireless circuit 111 can determine that transmission of the image data of one frame has been completed. When the wireless circuit 111 determines that the transmission has been completed (Step S1504—YES), the processing of Step S1505 is executed. When the wireless circuit 111 determines that the transmission has not been completed (Step S1504—NO), the processing of Step S1501 is executed and the wireless circuit 111 changes the image data packet of a processing target.
(Step S1505) The wireless circuit 111 notifies the control unit 101 of frame information indicating the frame number of the frame for which transmission of the image data of one frame has been completed. Thereafter, the processing of Step S1501 is executed. The wireless circuit 111 changes the frame of a transmission target to the next frame.

Next, an example of an operation of the reception device 200 will be described.

Figure 10:
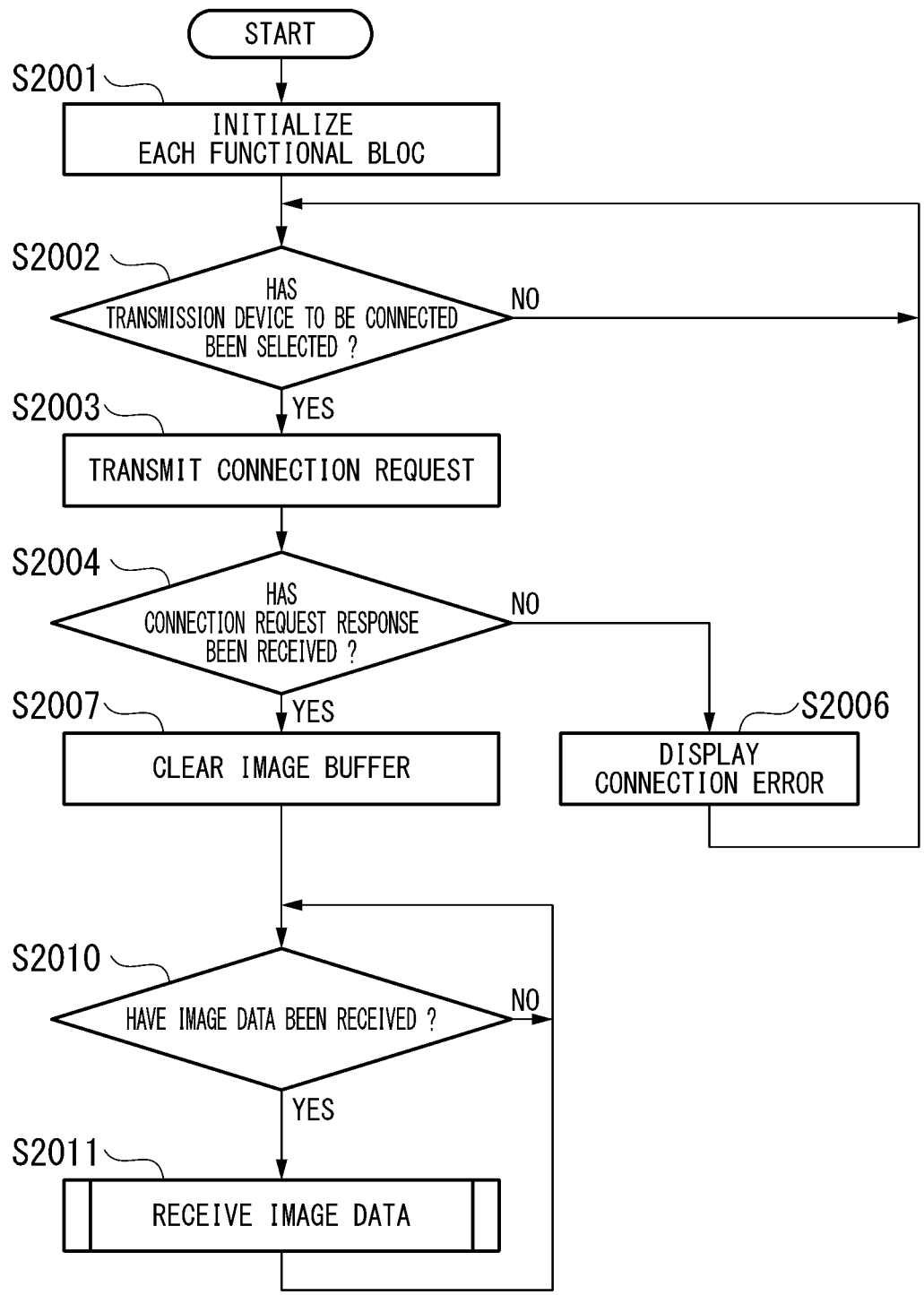
FIG. 10 is a flow chart showing an example of an operation of the reception device according to the first embodiment.

FIG. 10 is a flow chart showing an example of an operation of the reception device 200 according to the embodiment.
(Step S2001) When the supply of electric power is started (power source is turned on), the control unit 201 initializes each functional unit of the reception device 200. At this time, parameters required for the operation are set in each functional unit. For example, an initial value of a communication channel is set in the wireless communication unit 210. Thereafter, the processing of Step S2002 is executed.
(Step S2002) The control unit 201 determines whether or not the transmission device 100 that connects to the reception device 200 has been selected. The control unit 201 can determine whether or not the transmission device 100 has been selected on the basis of whether selection information is input from an operation input unit (not shown in the drawing). The operation input unit accepts the operation of an operator and outputs, to the control unit 201, the selection information indicating the transmission device 100 in accordance with the accepted operation. When the transmission device 100 is selected (Step S2002—YES), the processing of Step S2003 is executed. When the transmission device 100 is not selected (Step S2002—NO), the processing of Step S2002 is repeated.
(Step S2003) The control unit 201 wirelessly transmits a connection request to ask the selected transmission device 100 for connection with the reception device 200 via the wireless communication unit 210. Thereafter, the processing of Step S2004 is executed.
(Step S2004) The control unit 201 determines whether or not a connection request response has been received in a predetermined period since transmitting the connection request. When the connection request response has been received (Step S2004—YES), the connection with the transmission device 100 is established. Thereafter, the processing of Step S2007 is executed. When the connection request response has not been received (Step S2004—NO), the processing of Step S2006 is executed.
(Step S2006) The control unit 201 displays connection error information on the monitor unit 230. Here, the control unit 201 reads the connection error information stored in advance from the ROM 202 and outputs the read connection error information to the monitor unit 230 via the image processing unit 220. Thereafter, the processing of Step S2002 is executed.
(Step S2007) The control unit 201 deletes (clears) all the image data stored on the image memory 221. Thereafter, the processing of Step S2010 is executed.
(Step S2010) The control unit 201 determines whether or not the image data are being received from the transmission device 100 via the wireless communication unit 210. When the image data are being received (Step S2010—YES), the processing of Step S2011 is executed. When the image data are not being received (Step S2010—NO), the processing of Step S2010 is repeated.
(Step S2011) The control unit 201 executes reception processing of the image data. The reception processing of the image data will be described later. Thereafter, the processing of Step S2010 is executed.

Figure 11:
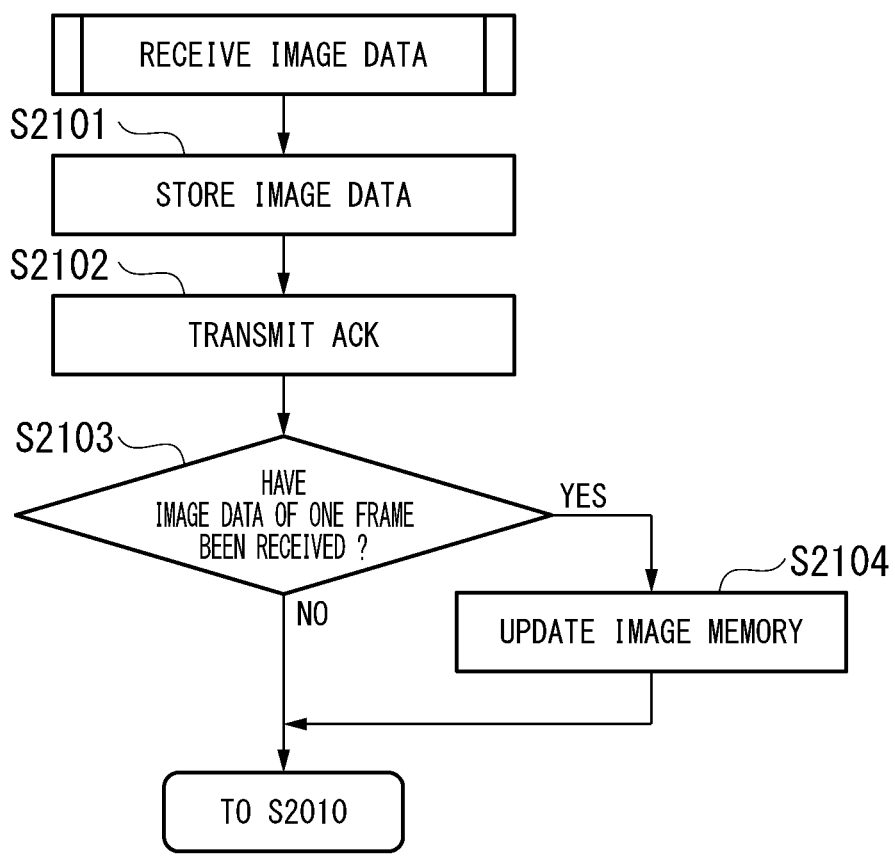
FIG. 11 is a flow chart showing an example of reception processing of image data according to the first embodiment.

Next, an example of the reception processing of the image data will be described. FIG. 11 is a flow chart showing an example of the reception processing of the image data according to the embodiment.
(Step S2101) The control unit 201 stores the image data packet received via the wireless communication unit 210 in a predetermined storage area of the RAM 203. Thereafter, the processing of Step S2102 is executed.
(Step S2102) The control unit 201 generates a response signal indicating the reception confirmation (ACK) of the received image data packet and transmits the generated response signal to the transmission device 100 via the wireless communication unit 210. When the control unit 201 detects the reception failure (NACK) of the image data packet, the control unit 201 may transmit a response signal indicating the reception failure of the image data packet to the transmission device 100. The control unit 201, for example, can determine the image data packet related to a lost packet ID as the image data packet of which reception has failed on the basis of the packet ID attached to each image data packet stored on the RAM 203. The control unit 101 of the transmission device 100 increases the packet ID attached to each image data packet by 1 in accordance with the order in which the image data packets are transmitted. Thereafter, the processing of Step S2103 is executed.
(Step S2103) The control unit 201 determines whether or not the image data of one frame have been received. The control unit 201, for example, extracts the segment data from each image data packet stored on the RAM 203 and reconfigures the image data by sequentially linking together the extracted pieces of segment data. When no data are lost in the reconfigured image data in one frame from a certain vertical synchronizing signal (Vsync) to a next vertical synchronizing signal, the control unit 201 can determine that the image data of one frame between the vertical synchronizing signals have been received. When the image data of one frame have been received (Step S2103—YES), the processing of Step S2104 is executed. When the image data of one frame have not been received (Step S2103—NO), the processing of Step S2010 (FIG. 10) is executed.
(Step S2104) The control unit 201 writes the received image data of one frame on the image memory 221 of the image processing unit 220, thus updating the image memory 221. The image processing unit 220 reads the image data stored on the image memory 221 for each frame specified by the vertical synchronizing signal (Vsync) and converts the read image data into an image signal (for example, any one of an NTSC signal, an HDMI signal, and the like) having a predetermined format. The image processing unit 220 outputs the converted image signal to the monitor unit 230. Thereafter, the processing of Step S2010 is executed.

Figure 12:
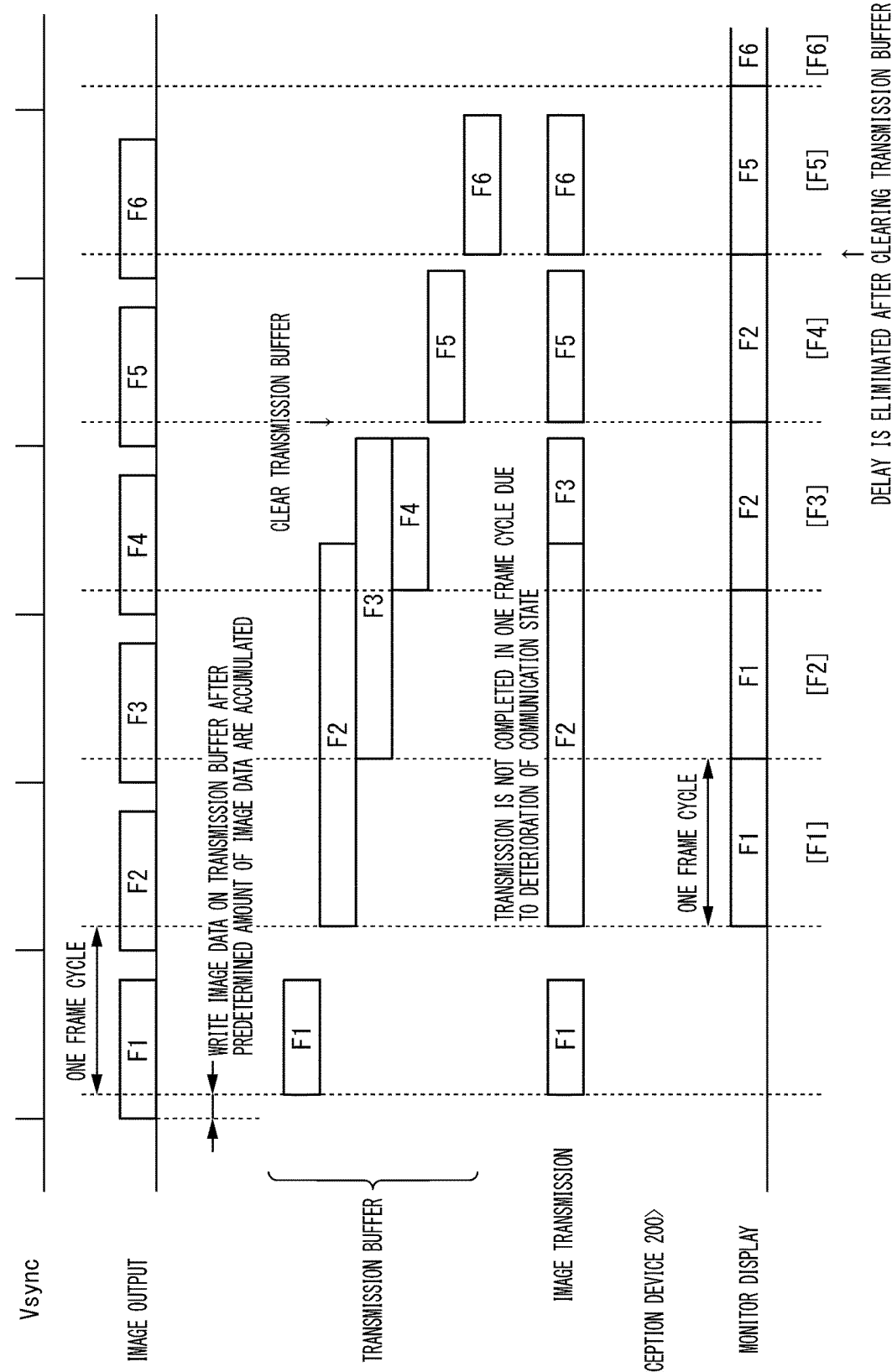
FIG. 12 is a sequence chart showing an example of an operation of the wireless communication system according to the first embodiment.

Next, an example of an operation of the wireless communication system 1 according to the embodiment will be described. FIG. 12 is a sequence chart showing an example of an operation of the wireless communication system 1 according to the embodiment.

FIG. 12 shows time points in the left and right directions and shows the vertical synchronizing signal (Vsync), image output, the transmission buffer, image transmission, and monitor display in the order from top to bottom.

The "vertical synchronizing signal (Vsync)" is attached to the image signal at the head of each frame among the image signals input from the imaging unit 121. As the "image output," the image signal indicating the image of each frame is output from the imaging unit 121 to the image processing unit 122. F1, F2, and the like indicate the frame number of each frame. The image processing unit 122 generates image data for each frame and outputs the image data to the control unit 101. The control unit 101 generates an image data packet for each piece of the segment data acquired by dividing the image data and sequentially writes the image data packets on the transmission buffer 112 after a predetermined amount of the generated image data packets are accumulated.

For example, when the frame F1 is transmitted, the communication state is good. At this time, the image data packet written on the transmission buffer 112 by the control unit 101 is transmitted immediately. This is because transmission of the image data packet is completed without delay and retransmission is not requested.

The "image transmission" indicates the frame related to the image data packet transmitted from the wireless circuit 111 to the reception device 200. The "monitor display" indicates the frame number of the frame displayed by the monitor unit 230. [F1] and the like indicate the frame number of the frame expected to be displayed in the frame cycle.

Regarding the image transmission, the wireless circuit 111 wirelessly transmits the image data packets to the reception device 200 in the order in which the image data packets are written on the transmission buffer 112. The control unit 201 of the reception device 200 extracts the segment data included in the image data packet received from the transmission device 100 via the wireless communication unit 210 and reconfigures the image data by linking together the extracted pieces of segment data. The control unit 201 outputs the reconfigured image data for each frame to the monitor unit 230 via the image processing unit 220 in the next frame cycle. Accordingly, the monitor unit 230 can display, in the next frame cycle, the image of the image data of the frame cycle (for example, the frame F1) in which the image data are received from the transmission device 100 when the communication state is good.

However, completion of transmitting the image data packets frequently fails as the communication state deteriorates. Accordingly, the image data packets not deleted from the transmission buffer 112 stagnate. For example, in the "transmission buffer" and the "image transmission," transmission of the image data packet of the frame F2 is not completed in one frame cycle and it takes a period of two frame cycles or more until completion of the transmission. Accordingly, the monitor unit 230 displays the image of the frame F1 in the period [F2] in which displaying the frame F2 is expected.

By the way, in the processing shown in FIG. 7, the control unit 101 determines that both the determination condition 1 and the determination condition 2 are established at the time of starting to write the image data of the frame F5 on the transmission buffer 112. The determination condition 1 is established because the transmission-completion frame is the frame F2 at the present time point and the previous transmission-completion frame is the frame F1. The transmission-completion frame is a frame of which transmission has been completed by the control unit 101 in the transmission device 100. The determination condition 2 is established because the frame to be stored on the transmission buffer after confirmation of the transmission-completion frame this time is the frame F5 that is three frames after the frame F2 of which transmission has been confirmed. Thereafter, the control unit 101 deletes all the image data packets stored on the transmission buffer 112 (clears the transmission buffer). Accordingly, the control unit 101 can write a new image data packet related to the frame F5 on the transmission buffer 112. After the communication state is restored, the wireless circuit 111 can sequentially and wirelessly transmit the image data packets to the reception device 200 in the order in which the image data packets are written on the transmission buffer 112. Accordingly, it is possible to eliminate delay of the image data by deleting the image data packets stored on the transmission buffer 112. In the example shown in FIG. 12, the monitor unit 230 can display the image of the frame F5 in the frame cycle [F5] next to the frame cycle related to the transmission of the image data of the frame F5.

Next, the embodiment will be summarized. The wireless communication system 1 includes the transmission device 100 and the reception device 200. The transmission device 100 includes the imaging unit 121 acquiring image data of a frame image captured for each predetermined frame cycle, the transmission buffer 112, the control unit 101, and the wireless communication unit 110 wirelessly communicating with the reception device 200. The control unit 101 causes the wireless communication unit 110 to transmit the image data stored on the transmission buffer 112 at a predetermined transmission speed, deletes the image data of which transmission has been completed from the transmission buffer 112, and confirms, for each frame cycle, the transmission-completion frame that is a frame of the image data of which transmission has been completed. In a case in which a first condition and a second condition are met, the control unit 101 stores the image data acquired by the imaging unit 121 on the transmission buffer 112 after deleting all the image data stored on the transmission buffer 112. In a case in which at least one of the first condition and the second condition is not met, the control unit 101 stores the image data acquired by the imaging unit 121 on the transmission buffer 112 without deleting the image data stored on the transmission buffer 112. The first condition indicates that a second frame that is the transmission-completion frame this time is after a first frame that is the previous transmission-completion frame. In other words, the first condition indicates that a frame number of the transmission-completion frame confirmed in a frame cycle this time is greater than a frame number of the transmission-completion frame confirmed in a previous frame cycle. The second condition indicates that a third frame is not the next frame of the second frame. The third frame is a frame of the image data to be stored on the transmission buffer after confirming the transmission-completion frame this time. In other words, the second condition indicates that a frame number of a frame of the image data to be stored on the transmission buffer 112 after the transmission-completion frame is confirmed in the frame cycle this time is greater than a frame number acquired by adding one to the frame number of the transmission-completion frame confirmed in the frame cycle this time.

According to this configuration, the reception device 200 can wait for completion of transmitting the image data of one frame including the image data of which transmission has been started. Therefore, the possibility that frame loss that is a phenomenon in which the image data of each frame is consecutively rejected is decreased. In addition, in a case in which transmission of the image data is delayed and fails to meet the expected time point for display and the image data stagnate in the transmission buffer, all the image data stored on the transmission buffer 112 are deleted. Since the image data remaining on the transmission buffer 112 are rejected and the newly acquired image data are transmitted, the transmission delay of the image data can be reduced.

Second Embodiment

Next, a second embodiment of the present invention will be described. Common reference numerals are attached to the configuration and the processing common to the first embodiment and the descriptions of the first embodiment will be cited.

In the embodiment, the control unit 201 of the reception device 200 identifies a frame of image data of which reception from the transmission device 100 has been completed. The control unit 201 generates frame information indicating the identified frame and transmits the generated frame information to the transmission device 100 via the wireless communication unit 210 as information of the application layer.

The control unit 101 of the transmission device 100 receives the frame information from the reception device 200 via the wireless communication unit 110. The control unit 101 confirms the frame indicated by the received frame information as a transmission-completion frame.

Next, an example of an operation of the transmission device 100 according to the embodiment will be described.

Figure 13:
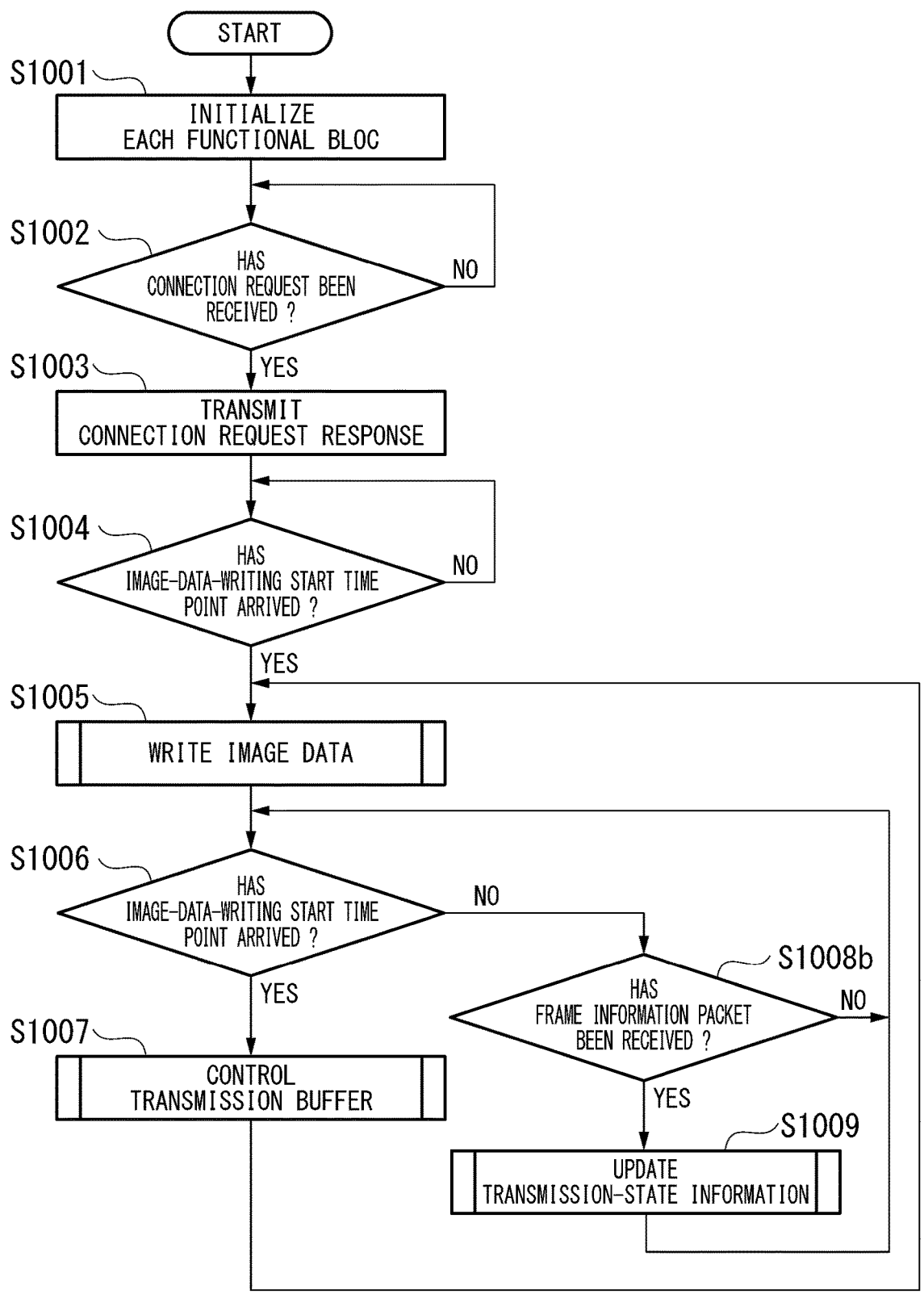
FIG. 13 is a flow chart showing an example of an operation of a transmission device according to a second embodiment.

FIG. 13 is a flow chart showing an example of an operation of the transmission device 100 according to the embodiment. The processing shown in FIG. 13 includes processing of Steps S1001 to S1007, S1009, and Step S1008b.

In the processing shown in FIG. 13, when the present time point has not passed by the image-data-writing start time point in Step S1006 (Step S1006—NO), the processing of Step S1008b is executed.

(Step S1008b) The control unit 101 determines whether or not a frame information packet in which the frame information is stored has been received from the reception device 200. When the control unit 101 determines that the frame information packet has been received (Step S1008b—YES), the processing of Step S1009 is executed. When the control unit 101 determines that the frame information packet has not been received (Step S1008b—NO), the processing of Step S1006 is executed.

Figure 14:
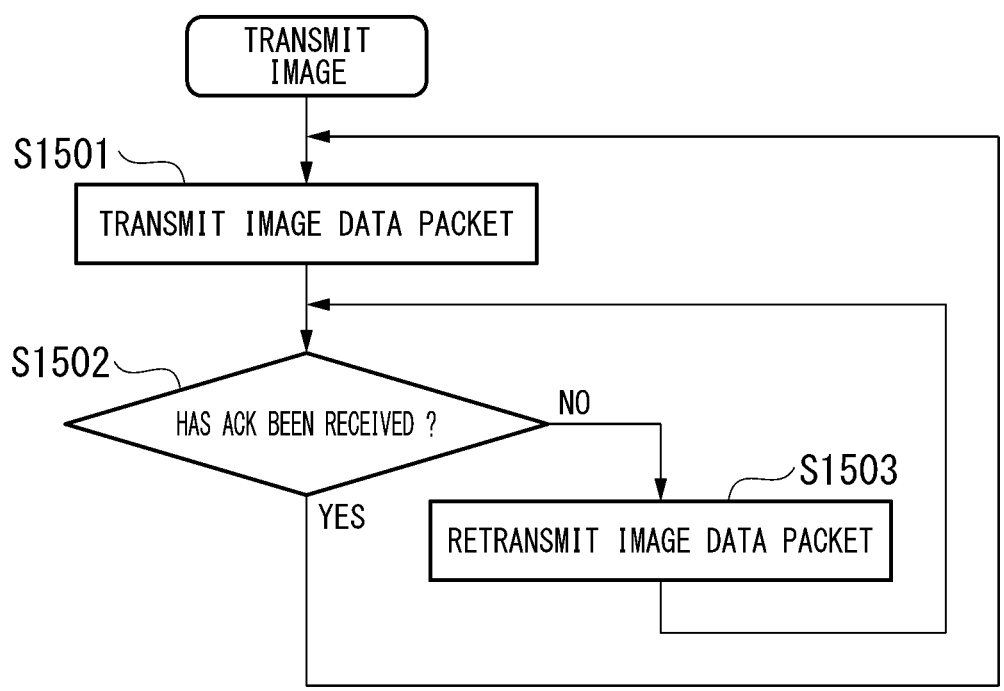
FIG. 14 is a flow chart showing an example of transmission processing of image data according to the second embodiment.

Next, an example of transmission processing of image data according to the embodiment will be described. FIG. 14 is a flow chart showing an example of the transmission processing of the image data according to the embodiment.

The processing in FIG. 0.14 includes processing of Steps S1501 to S1503. The processing in FIG. 0.14 does not include the processing of Steps S1504 and S1505 included in the processing in FIG. 9. In Step S1502, the wireless circuit 111 determines whether or not a reception confirmation (ACK) has been received from the reception device 200. When the wireless circuit 111 determines that the reception confirmation has been received (Step S1502—YES), the processing of Step S1501 is executed. In addition, after Step S1503, the processing of Step S1502 is executed.

Next, an example of an operation of the reception device 200 according to the embodiment will be described.

Figure 15:
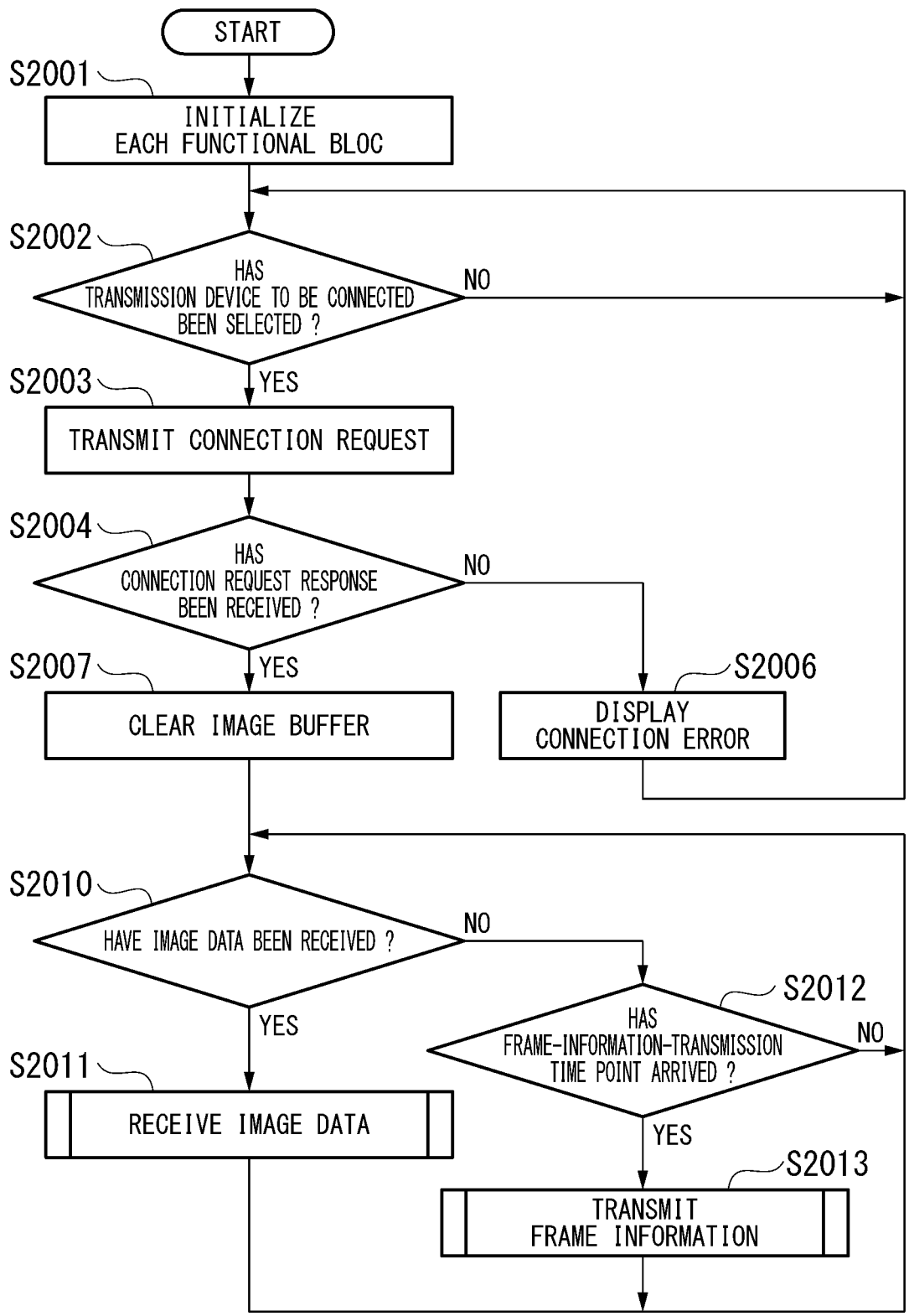
FIG. 15 is a flow chart showing an example of an operation of a reception device according to the second embodiment.

FIG. 15 is a flow chart showing an example of an operation of the reception device 200 according to the embodiment. The processing in FIG. 15 includes processing of Steps S2001 to S2004, S2006, S2007, and S2010 to S2013. When the image data are not being received in Step S2010 (Step S2010—NO), the processing of Step S2012 is executed.

(Step S2012) The control unit 201 determines whether or not the present time point has passed by a frame-information-packet-transmission time point. The control unit 201, for example, can determine that the present time point has passed by the frame-information-packet-transmission time point when the time point of a tinier (frame-information-transmission timer) at the present time point reaches a predetermined time point. The frame-information-packet-transmission time point is set in advance to a time point closer to the end time point of each frame cycle than the start time point of each frame cycle. When the present time point has passed by the frame-information-packet-transmission time point (Step S2012—YES), the processing of Step S2013 is executed. When the present time point has not passed by the frame-information-packet-transmission time point (Step S2012—NO), the processing of Step S2010 is executed. Thereafter, the processing of Step S2013 is executed.

(Step S2013) The control unit 201 executes frame-information-transmission processing described later. Thereafter, the processing of Step S2010 is executed.

Figure 16:
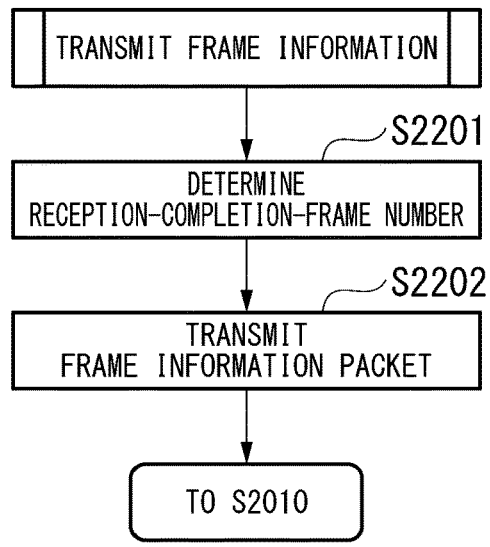
FIG. 16 is a flow chart showing an example of transmission processing of an uplink packet according to the second embodiment.

Next, an example of the frame-information-transmission processing will be described. FIG. 16 is a flow chart showing an example of the frame-information-transmission processing according to the embodiment.

(Step S2201) The control unit 201 determines a frame number of a reception-completion frame of which reception has been completed last at the present time point. Thereafter, the processing of Step S2202 is executed.

(Step S2202) The control unit 201 generates frame information packet as the frame information indicating the determined frame number and transmits the generated frame information packet to the transmission device 100 via the wireless communication unit 210. Thereafter, the processing of Step S2010 (FIG. 15) is executed.

Figure 17:
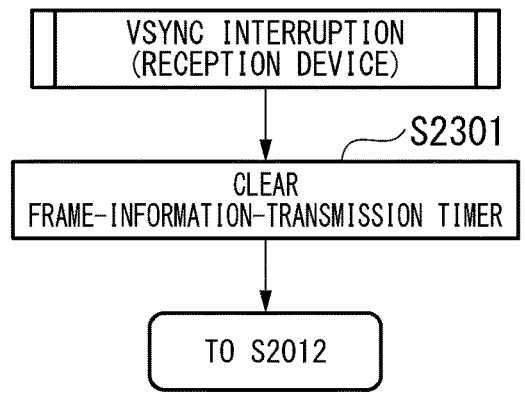
FIG. 17 is a flow chart showing an example of interruption processing of a vertical synchronizing signal according to the second embodiment.

Next, an example of interruption processing of a vertical synchronizing signal (Vsync) according to the embodiment will be described. FIG. 17 is a flow chart showing an example of the interruption processing of the vertical synchronizing signal according to the embodiment. The processing in HG 17 is different from the processing in FIG. 8 in terms of processing executed by the reception device 200.

(Step S2301) The control unit 201 sets the time point of the timer (frame-information-transmission timer) to an initial value for each vertical synchronizing period (Vsync period). The control unit 201 can identify the vertical synchronizing period by detecting a vertical synchronizing signal from the image data stored on the RAM 203. Accordingly, the timer of the control unit 201 can set the time point to the predetermined initial value for each frame and can start measuring a time point. The measured time point is used in the processing of Step S2012 (FIG. 15).

Figure 18:
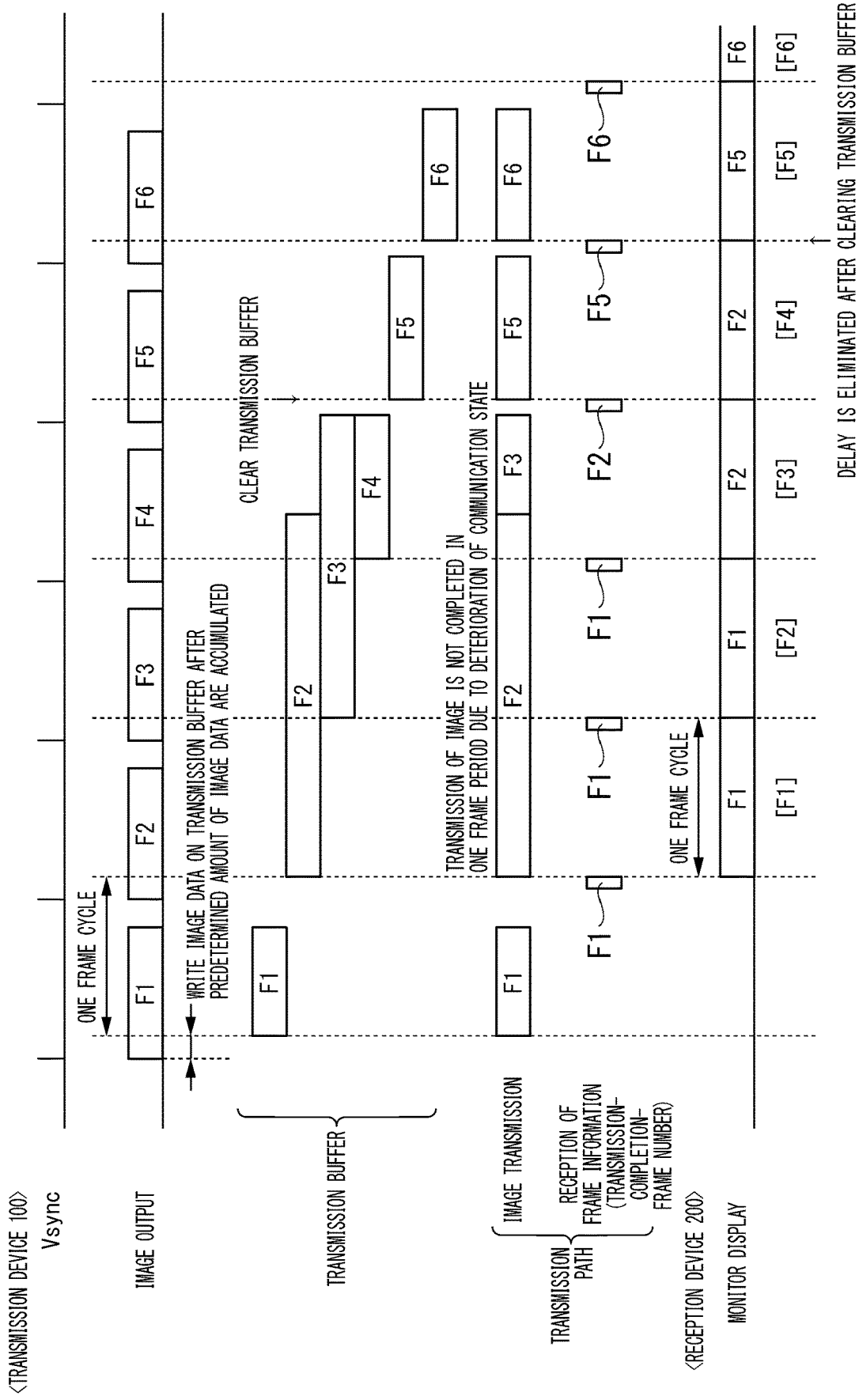
FIG. 18 is a sequence chart showing an example of an operation of a wireless communication system according to the second embodiment.

Next, an example of an operation of the wireless communication system 1 according to the embodiment will be described. FIG. 18 is a sequence chart showing an example of an operation of the wireless communication system 1 according to the embodiment.

In the example shown in FIG. 18, capturing images, storing the image data on the transmission buffer 112, transmitting the image data, and timings of image display are similar to those in the example shown in FIG. 12.

In FIG. 18, a row showing reception of the frame information is further provided with respect to FIG. 12. "Reception of frame information" indicates a timing at which the control unit 101 of the transmission device 100 receives the frame information packet via a transmission path from the reception device 200. The frame information indicates a frame number of the image data of which reception is completed by the reception device 200. In the example shown in FIG. 18, at the frame-information-packet-transmission time point that is the end of the frame cycle in which the image data packet of the frame F1 is transmitted, the control unit 201 of the reception device 200 determines that the reception-completion frame of which reception has been completed last is the frame F1. The control unit 201 transmits the frame information packet including the frame information indicating the frame F1 to the transmission device 100. The control unit 101 of the transmission device 100 detects the frame information from the frame information packet received from the reception device 200 and confirms that the frame F1 indicated by the detected frame information as the transmission-completion frame of which transmission has been completed last at the present time point. In the example shown in FIG. 18, the transmission-completion frame thereafter is the frames F1, F1, F2, F5, and F6 in this order. The transmission-completion frame suddenly changes from F2 to F5 between the fourth frame cycle and the fifth frame cycle in FIG. 18 because all the image data packets stored on the transmission buffer 112 are deleted (cleared) at the image-data-writing start time point in the fifth frame cycle. At this time point, both the determination condition 1 and the determination condition 2 described above are met. Thus, in the fifth frame period, the frame information packet including new segment data is newly stored on the transmission buffer 112 and immediately transmitted to the reception device 200 via the wireless circuit 111.

The control unit 101 uses the frame number indicated by the frame information received at the present time point as the second frame number in the determination condition 1 and the determination condition 2. In addition, the control unit 101 uses the frame number indicated by the frame information received in the previous frame cycle as the first frame number in the determination condition 1 and the determination condition 2. Therefore, in the embodiment, unlike the first embodiment, it is possible to omit the processing in which the wireless circuit 111 determines whether or not transmission of the image data of one frame has been completed for all the image data packets in each frame by determining whether or not the reception confirmation (ACK) transmitted as information of the data link layer that is a lower layer. In addition, the control unit 201 of the reception device 200 can omit the processing of generating a response signal indicating the reception confirmation (ACK) of the received image data packet and transmitting the response signal to the transmission device 100.

Next, the embodiment is summarized. In the wireless communication system 1, the reception device 200 includes the control unit 201 that identifies a frame of the image data of which reception has been completed and transmits the frame information indicating the identified frame to the transmission device 100. In addition, the control unit 101 of the transmission device 100 confirms that the frame indicated by the frame information received from the reception device 200 as the transmission-completion frame.

According to this configuration, it is possible to determine completion of transmission for each frame without transmitting the transmission confirmation of the image data for each image data packet. Therefore, it is possible to reduce the load of processing in transmitting the image data from the transmission device 100 to the reception device 200 and effectively take advantage of resources required for wireless communication.

The embodiment of the present invention is described above and various kinds of modifications can be added as long as they do not deviate from the scope of the summary of the present invention.

In the example shown in HG 3, the monitor unit 230 is independent of the reception device 200, but the embodiment of the present invention is not limited to this. The reception device 200 may be configured as the single reception device 200 including the monitor unit 230.

In addition, in the wireless communication system 1 of the above embodiment, an example in which the transmission device 100 and the reception device 200 communicate with each other in a communication mode (infrastructure mode) in which the transmission device 100 and the reception device 200 mainly function as a client and an access point respectively is described, but the embodiment of the present invention is not limited to this. The transmission device 100 and the reception device 200 may communicate with each other in a communication mode (ad-hoc mode) in which the transmission device 100 and the reception device 200 are equals. In addition, the transmission device 100 may function as a repeater that relays the image data received from another device to the reception device 200. In such a case, the imaging unit 121 may be omitted in the transmission device 100.

Part of the transmission device 100, for example, the control unit 101 and part of the reception device 200, for example, the control unit 201 may be realized by a computer. In such a case, the program for realizing this control function may be realized by recording the program on a computer-readable recording medium, reading the program recorded on the recording medium onto a computer system, and executing the program. Here, the "computer system" described above is configured to be a computer system built in the transmission device 100 or the reception device 200 and include OS and hardware such as a peripheral device. In addition, the "computer-readable recording medium" means a portable medium such as a flexible disk, a magneto-optical disk, a ROM, and a CD-ROM and a storage device such as a hard disk built in the computer system. Moreover, the "computer-readable recording medium" may dynamically hold a program for a short period of time like a communication line or the like used in a case in which the program is transmitted by using a network such as the Internet and a communication circuit line such as a telephone circuit line or may hold the program for a certain period of time like a volatile memory inside the computer system that is a server or a client of the case. In addition, the above-described program may be configured to realize some of the functions described above and may be configured to realize the functions described above in combination with a program that has already been recorded in the computer system.

In addition, all or part of the transmission device 100 and the reception device 200 in the embodiment of the present invention described above may be realized as an integration circuit such as the large scale integration (LSI) or the like. Each of the functional blocks of the transmission device 100 and the reception device 200 may be separately configured as a processor or all or some of the functional blocks may be integrated to configure a processor. For example, the control unit 101 and the control unit 201 described above may be configured as control circuits independent of each other. In addition, the technique of integrating circuits is not limited to the LSI and may be realized by a dedicated circuit or a general-purpose processor. Moreover, in a case in which the technique of integrating circuits that replaces the LSI emerges according to the advancement of the semiconductor technology, an integration circuit realized by the technique may be used.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication system, comprising:
    a transmission device; and
    a reception device,
    wherein the transmission device includes:
        an imaging device configured to acquire image data of a frame image captured for each predetermined frame cycle;
        a transmission buffer;
        a processor; and
        a communicator configured to wirelessly communicate with the reception device,
    the processor is configured to:
        cause the communicator to transmit the image data stored on the transmission buffer at a predetermined transmission speed;
        delete the image data of which transmission has been completed from the transmission buffer;
        confirm, for each frame cycle, a transmission-completion frame that is a frame of the image data of which transmission has been completed;
        store the image data acquired by the imaging device on the transmission buffer after deleting all the image data stored on the transmission buffer in a case in which a first condition and a second condition are met,
            wherein the first condition indicates that a frame number of the transmission-completion frame confirmed in a frame cycle this time is greater than a frame number of the transmission-completion frame confirmed in a previous frame cycle,
            wherein the second condition indicates that a frame number of a frame of the image data to be stored on the transmission buffer after the transmission-completion frame is confirmed in the frame cycle this time is greater than a frame number acquired by adding one to the frame number of the transmission-completion frame confirmed in the frame cycle this time, and
        store the image data acquired by the imaging device on the transmission buffer without deleting the image data stored on the transmission buffer in a case in which at least one of the first condition and the second condition is not met.

2. The communication system according to claim 1, wherein the reception device includes a processor configured to identify a frame of the image data of which reception has been completed and transmit frame information indicating the identified frame to the transmission device, and
    the processor of the transmission device is configured to confirm the frame indicated by the frame information received from the transmission device as the transmission-completion frame.

3. A transmission device, comprising:
    an imaging device configured to acquire image data of a frame image captured for each predetermined frame cycle;
    a transmission buffer;
    a processor; and
    a communicator configured to wirelessly communicate with a reception device,
    wherein the processor is configured to:
        cause the communicator to transmit the image data stored on the transmission buffer at a predetermined transmission speed;
        delete the image data of which transmission has been completed from the transmission buffer;
        confirm, for each frame cycle, a transmission-completion frame that is a frame of the image data of which transmission has been completed;
        store the image data acquired by the imaging device on the transmission buffer after deleting all the image data stored on the transmission buffer in a case in which a first condition and a second condition are met,
            wherein the first condition indicates that a frame number of the transmission-completion frame confirmed in a frame cycle this time is greater than a frame number of the transmission-completion frame confirmed in a previous frame cycle,
            wherein the second condition indicates that a frame number of a frame of the image data to be stored on the transmission buffer after the transmission-completion frame is confirmed in the frame cycle this time is greater than a frame number acquired by adding one to the frame number of the transmission-completion frame confirmed in the frame cycle this time, and
        store the image data acquired by the imaging device on the transmission buffer without deleting the image data stored on the transmission buffer in a case in which at least one of the first condition and the second condition is not met.

4. A communication method executed by a transmission terminal including an imaging device configured to acquire image data of a frame image captured for each predetermined frame cycle, a transmission buffer, and a communicator configured to wirelessly communicate with a reception device,
    wherein the method comprises:
        a first step of causing the communicator to transmit the image data stored on the transmission buffer to the reception device at a predetermined transmission speed;
        a second step of deleting the image data of which transmission has been completed from the transmission buffer;

a third step of confirming, for each frame cycle, a transmission-completion frame that is a frame of the image data of which transmission has been completed;

a fourth step of storing the image data acquired by the imaging device on the transmission buffer after deleting all the image data stored on the transmission buffer in a case in which a first condition and a second condition are met,
 wherein the first condition indicates that a frame number of the transmission-completion frame confirmed in a frame cycle this time is greater than a frame number of the transmission-completion frame confirmed in a previous frame cycle,
 wherein the second condition indicates that a frame number of a frame of the image data to be stored on the transmission buffer after the transmission-completion frame is confirmed in the frame cycle this time is greater than a frame number acquired by adding one to the frame number of the transmission-completion frame confirmed in the frame cycle this time, and a fifth step of storing the image data acquired by the imaging device on the transmission buffer without deleting the image data stored on the transmission buffer in a case in which at least one of the first condition and the second condition is not met.

5. A non-transitory computer-readable recording medium saving a program for causing a computer of a transmission terminal including an imaging device configured to acquire image data of a frame image captured for each predetermined frame cycle, a transmission buffer, and a communicator configured to wirelessly communicate with a reception device to execute:

a first process of causing the communicator to transmit the image data stored on the transmission buffer to the reception device at a predetermined transmission speed;

a second process of deleting the image data of which transmission has been completed from the transmission buffer;

a third process of confirming, for each frame cycle, a transmission-completion frame that is a frame of the image data of which transmission has been completed;

a fourth process of storing the image data acquired by the imaging device on the transmission buffer after deleting all the image data stored on the transmission buffer in a case in which a first condition and a second condition are met,
 wherein the first condition indicates that a frame number of the transmission-completion frame confirmed in a frame cycle this time is greater than a frame number of the transmission-completion frame confirmed in a previous frame cycle,
 wherein the second condition indicates that a frame number of a frame of the image data to be stored on the transmission buffer after the transmission-completion frame is confirmed in the frame cycle this time is greater than a frame number acquired by adding one to the frame number of the transmission-completion frame confirmed in the frame cycle this time, and a fifth process of storing the image data acquired by the imaging device on the transmission buffer without deleting the image data stored on the transmission buffer in a case in which at least one of the first condition and the second condition is not met.

* * * * *